US010513954B2

(12) United States Patent
Fletcher et al.

(10) Patent No.: US 10,513,954 B2
(45) Date of Patent: Dec. 24, 2019

(54) RESTRICTORS USING THE VENTURI EFFECT

(71) Applicants: David E. Fletcher, Flint, MI (US);
Brian M. Graichen, Leonard, MI (US);
James H. Miller, Ortonville, MI (US);
Keith Hampton, Ann Arbor, MI (US)

(72) Inventors: David E. Fletcher, Flint, MI (US);
Brian M. Graichen, Leonard, MI (US);
James H. Miller, Ortonville, MI (US);
Keith Hampton, Ann Arbor, MI (US)

(73) Assignee: Dayco IP Holdings, LLC, Troy, MI (US)

( * ) Notice: Subject to any disclaimer, the term of this patent is extended or adjusted under 35 U.S.C. 154(b) by 0 days.

(21) Appl. No.: 15/245,941

(22) Filed: Aug. 24, 2016

(65) Prior Publication Data

US 2017/0058731 A1  Mar. 2, 2017

Related U.S. Application Data

(60) Provisional application No. 62/211,408, filed on Aug. 28, 2015.

(51) Int. Cl.
*F01M 13/02* (2006.01)
*F02B 33/00* (2006.01)
(Continued)

(52) U.S. Cl.
CPC ........ *F01M 13/028* (2013.01); *F01M 13/023* (2013.01); *F02B 33/00* (2013.01);
(Continued)

(58) Field of Classification Search
CPC .. F01M 13/028; F01M 13/023; F01M 13/021; F01M 2013/0005;
(Continued)

(56) References Cited

U.S. PATENT DOCUMENTS

| | | | | |
|---|---|---|---|---|
| 1,850,030 A | * | 3/1932 | Pardoe | G01F 1/44 138/44 |
| 2,313,462 A | * | 3/1943 | Brooks | F01B 31/10 184/39.1 |

(Continued)

FOREIGN PATENT DOCUMENTS

| | | |
|---|---|---|
| CN | 101939536 A | 5/2011 |
| DE | 102009032835 A1 | 2/2011 |

(Continued)

OTHER PUBLICATIONS

A Machine Transaltion to Greif Volker et al. (Pub. Number DE 10 2009 032 835 A1), published on Feb. 3, 2011.*

(Continued)

*Primary Examiner* — Thai Ba Trieu
(74) *Attorney, Agent, or Firm* — FisherBroyles, LLP; Susan M. Oiler

(57) ABSTRACT

Restrictors are disclosed that include a body defining a Venturi tube having a throat defining a junction of a converging inlet cone to a diverging outlet cone along a longitudinal axis thereof, and with the converging inlet cone and the diverging outlet cone each defining an inner passageway that transitions as a hyperbolic or parabolic function toward the throat.

22 Claims, 11 Drawing Sheets

(51) Int. Cl.
*F02M 35/104* (2006.01)
*F02M 35/10* (2006.01)
*F02M 25/06* (2016.01)
*F01M 13/00* (2006.01)
*F02M 26/10* (2016.01)
*F02M 26/19* (2016.01)

(52) U.S. Cl.
CPC .......... *F02M 25/06* (2013.01); *F02M 35/104* (2013.01); *F02M 35/10222* (2013.01); *F01M 2013/0038* (2013.01); *F01M 2013/0044* (2013.01); *F01M 2013/026* (2013.01); *F02M 26/10* (2016.02); *F02M 26/19* (2016.02); *F16N 2270/22* (2013.01); *Y02T 10/121* (2013.01)

(58) Field of Classification Search
CPC ...... F01M 2013/0038; F01M 2013/004; F02B 33/00; F02M 35/104; F16N 2270/22; Y02T 10/121
USPC ................... 60/605.1; 123/572–574; 290/54; 251/122, 124; 137/513.5, 892, 14
See application file for complete search history.

(56) References Cited

U.S. PATENT DOCUMENTS

| | | | | |
|---|---|---|---|---|
| 2,424,654 A * | 7/1947 | Gamble | ................ | B01F 5/0403 137/892 |
| 2,704,555 A * | 3/1955 | Dall | .......................... | G01F 1/44 138/44 |
| 2,795,931 A | 6/1957 | Le Foll | | |
| 2,799,468 A * | 7/1957 | Van Deventer | ....... | F16K 27/062 251/124 |
| 2,803,116 A * | 8/1957 | Tilney | ................... | F25B 39/028 137/14 |
| 2,813,138 A * | 11/1957 | MacQueen | ................ | C07C 2/78 422/207 |
| 2,815,070 A * | 12/1957 | Lamar | ..................... | F23D 14/64 48/180.1 |
| 2,887,390 A | 5/1959 | Coulter et al. | | |
| 3,014,426 A * | 12/1961 | Smith, Jr. | ................ | B64C 13/00 244/189 |
| 3,022,934 A * | 2/1962 | Gerald | ....................... | F01N 3/30 417/168 |
| 3,083,414 A * | 4/1963 | Gasser | ..................... | D01H 5/72 19/150 |
| 3,104,947 A | 9/1963 | Switzer et al. | | |
| 3,370,407 A * | 2/1968 | Morawski | .............. | B01D 47/10 55/391 |
| 3,643,431 A * | 2/1972 | Jamieson | ................... | F01D 9/00 138/45 |
| 3,680,534 A * | 8/1972 | Chavant | ................. | F02M 26/19 123/568.17 |
| 4,031,913 A * | 6/1977 | Apellaniz | ............ | B67D 1/0802 137/170.1 |
| 4,239,505 A * | 12/1980 | Drnevich | .................. | B03C 3/36 95/74 |
| 4,295,883 A * | 10/1981 | Lajh | ................... | B01D 19/0005 266/208 |
| 4,516,434 A * | 5/1985 | Halmi | ....................... | G01F 1/44 73/861.64 |
| 4,760,695 A * | 8/1988 | Brown | .................... | F02K 7/105 60/204 |
| 4,765,134 A * | 8/1988 | Brown | .................... | F02K 7/105 60/204 |
| 5,368,273 A * | 11/1994 | Dante | ....................... | F16K 1/38 251/122 |
| 5,421,766 A * | 6/1995 | Shank, Jr. | ................. | B24C 5/04 451/102 |
| 6,041,734 A * | 3/2000 | Raoux | ................... | C23C 16/345 156/345.44 |
| 6,623,154 B1 * | 9/2003 | Garcia | .................. | B01F 5/0415 366/163.2 |
| 6,868,830 B1 * | 3/2005 | Meyer | .............. | F02M 35/10118 123/445 |
| 6,945,048 B2 * | 9/2005 | Whiting | .............. | F02B 29/0406 123/559.1 |
| 6,969,052 B2 * | 11/2005 | Korzeniowski | ....... | B01F 3/0446 261/76 |
| 7,353,811 B2 * | 4/2008 | Weisz | .............. | F02M 35/10118 123/568.17 |
| 7,431,023 B2 | 10/2008 | Kavanagh et al. | | |
| 7,804,186 B2 * | 9/2010 | Freda | ........................ | F03D 9/11 290/55 |
| 8,089,173 B2 | 1/2012 | Freda | | |
| 8,596,339 B2 | 12/2013 | Palanchon | | |
| 8,814,493 B1 | 8/2014 | Komp | | |
| 9,074,540 B2 * | 7/2015 | Subramanian | ......... | F02M 26/19 |
| 9,448,091 B2 * | 9/2016 | Woodsend | ............. | F02M 26/47 |
| 2003/0015596 A1 * | 1/2003 | Evans | ................... | B01F 5/0413 239/8 |
| 2007/0025862 A1 * | 2/2007 | Tice | .......................... | F04F 5/16 417/151 |
| 2008/0315592 A1 | 12/2008 | Branco | | |
| 2011/0132311 A1 * | 6/2011 | Pursifull | .......... | F02M 35/10229 123/184.56 |
| 2012/0285425 A1 | 11/2012 | Spix | | |
| 2014/0360607 A1 | 12/2014 | Fletcher et al. | | |
| 2015/0159665 A1 | 6/2015 | Fletcher et al. | | |
| 2016/0153472 A1 * | 6/2016 | Fletcher | .............. | F01M 13/022 123/519 |
| 2016/0189808 A1 * | 6/2016 | Cheatham, III | ....... | F16K 15/028 137/513.5 |
| 2016/0245236 A1 * | 8/2016 | Graichen | ......... | F02M 35/10229 |
| 2016/0298656 A1 * | 10/2016 | Fletcher | .................... | F04F 5/46 |
| 2017/0016414 A1 * | 1/2017 | Fletcher | .......... | F02M 35/10118 |
| 2017/0122153 A1 * | 5/2017 | Hampton | ............. | F01M 13/021 |
| 2017/0316133 A1 * | 11/2017 | Abramov | ................ | G06F 17/13 |

FOREIGN PATENT DOCUMENTS

| | | | | |
|---|---|---|---|---|
| GB | 558091 A * | 12/1943 | ................ | F41F 3/08 |
| GB | 2527096 A * | 12/2015 | ................ | F04F 5/42 |

OTHER PUBLICATIONS

PCT, International Search Report and Written Opinion; Patent Application No. PCT/US2016/048432 (dated Nov. 7, 2016).
CN, First Office Action, Chinese Application No. 2016800474611 (dated Oct. 11, 2018).
CN, First Office Action Search Report, Chinese Application No. 2016800474611 (dated Oct. 11, 2018).
EP, International Search Report: European Application No. 16842616.1 (dated Mar. 26, 2019).
CN, Second Office Action, Chinese Application No. 2016800474611 (dated May 15, 2019).

* cited by examiner

RESTRICTORS USING THE VENTURI EFFECT

RELATED APPLICATIONS

This application claims the benefit of U.S. Provisional Application No. 62/211,408, filed Aug. 28, 2015, which is incorporated herein by reference.

TECHNICAL FIELD

This application relates to restrictors using the Venturi effect for producing a generally constant flow of fluid therethrough during operating pressure changes, more particularly to such restrictors for use in a positive crankcase ventilation system.

BACKGROUND

Operational needs require that the air and/or gas inside an engine's crankcase is removed. This ensures that pressure does not build up due to blowby gas past the rings and pistons of the engine, and that fuel and water do not accumulate in the crankcase. Worldwide there are regulations that require the crankcase gasses to be passed through the combustion chamber, to minimize the release of harmful emissions. One method for doing this is to connect the crankcase to the intake manifold, downstream of the throttle for naturally aspirated engines, and upstream of the compressor for boosted engines as shown in U.S. Pat. No. 8,695,339.

This flow constitutes a potential shift to the engine's calibration in that this gas flow may vary due to the pressure drop between the crankcase and the intake manifold. Furthermore, the mixture of oil vapor, fuel vapor, products of combustion, and water that exits the crankcase can form deposits on any valving used to control the flow to a fixed amount, which may be undesirable.

A need exists for improved restrictors in such systems to ensure that flow is generally or even substantially constant, while avoiding the problems with the valves. A simple solution that minimizes the mass and volume flow variation of the fluid through the restrictor in response to variations in manifold pressure is needed.

SUMMARY

Restrictors for use in fluid flow systems within an internal combustion engine, such as a vehicle engine, are disclosed herein. In all aspects, the restrictors have a body defining a Venturi tube having a throat defining a junction of a converging inlet cone to a diverging outlet cone along a longitudinal axis thereof where the converging inlet cone and the diverging outlet cone each define an inner passageway that transitions as a hyperbolic or parabolic function toward the throat. The inlet cone may have a circular geometry or a non-circular geometry when viewed as a cross-section transverse to the longitudinal axis. In one embodiment, the inlet cone has a non-circular geometry, which is generally rectangular, and/or the outlet cone has a non-circular geometry, which is also generally rectangular.

In one aspect, the inner passageway of the inlet cone and the inner passageway of the outlet cone both transition as a hyperbolic function toward the throat, and a length of the converging inlet cone and a length of the diverging outlet cone have a ratio in the range of 1:5 to 1:8, and more preferably in the range of 1:6 to 1:8.

In another aspect, the inner passageway of the inlet cone and the inner passageway of the outlet cone both transition as a parabolic function toward the throat, and a length of the converging inlet cone and a length of the diverging outlet cone have a ratio in the range of 1:3 to 1:5.

In all of the disclosed embodiments, the inlet cone may begin with a rounded chamfer directing fluid flow into the inlet cone, and the outlet cone may terminate with a rounded chamfer directing fluid flow out of the outlet cone.

In another aspect, systems are disclosed that include any one of the restrictors herein with a first component in fluid communication with the inlet cone of the restrictor, and a second component in fluid communication with the outlet cone of the restrictor, which during operation of the system, experience a pressure drop between the first component and the second component. In one embodiment, the first component is a crankcase and the fluid in fluid communication with the inlet cone is blowby gas, and the second component is an air intake manifold of an engine. In one embodiment, the engine is a naturally aspirated engine or a boosted engine.

In another embodiment, the first component is a crankcase and the fluid in fluid communication with the inlet cone is blowby gas, and the second component is a compressor of a turbocharger.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate the same or similar parts throughout the several views.

DETAILED DESCRIPTION

Figure 1A:
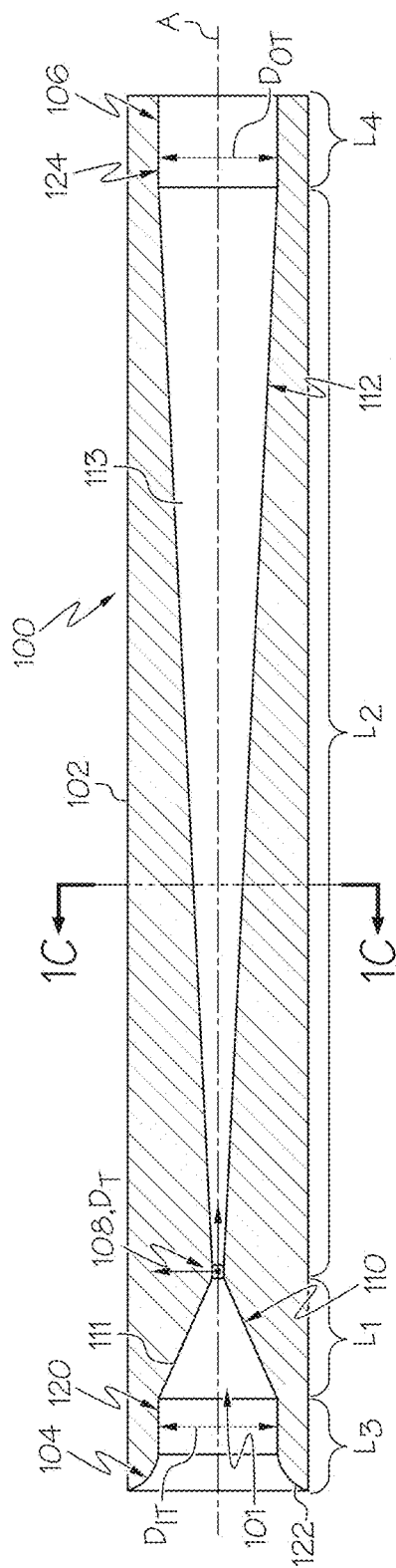
FIGS. 1A and 1B are cross-sectional, plan views of embodiments of restrictors having a Venturi tube with an inlet cone and an outlet cone converging and diverging according to a hyperbolic function, one without radius transitions and the other with radius transitions.

The following detailed description will illustrate the general principles of the invention, examples of which are additionally illustrated in the accompanying drawings. In the drawings, like reference numbers indicate identical or functionally similar elements.

As used herein, "fluid" means any liquid, suspension, colloid, gas, plasma, or combinations thereof.

FIGS. 1A through 2B are of restrictors 100, 100', 200, and 200' that have superior results and require less material (have cheaper material costs) to provide such results because the overall length of the restrictor can be reduced when having an inlet cone 110, 210 and an outlet cone 112, 212 transitioning toward a throat 108, 208 thereof as a parabolic or hyperbolic function. Also, the parabolic or hyperbolic shaped restrictors ensure a nearly constant rate of flow independent of the pressure drop across the restrictor. This is done by ensuring that the mass flowing through the restrictor reaches sonic velocity. With a fixed inlet density, varying only due to atmospheric pressure and temperature, the mass flow rate is the product of the density times the throat area times the speed of sound. While any shape of restriction will cause some of the gas flow to be sonic, in previous technology this was restricted to a region of the flow called vena contracta, or the portion of the flow channel that is at the speed of sound. In these prior art restrictor geometries, the vena contracta size would vary according to the pressure difference across the restrictor. Because the derivative of the hyperbola or parabola is exactly 0 and the midplane of the throat has every molecule or atom of fluid at the speed of sound, there is no vena contracta.

Starting with FIG. 1A, the features of the restrictor 100 include a body 102 having an inlet end 104 and an outlet end 106, and defining a Venturi tube 101 having a throat 108 defining a junction of the inlet cone 110 converging toward the throat and the outlet cone 112 diverging away from the throat along a longitudinal axis A. The inlet cone 110 and the outlet cone 112 each define an inner passageway 111, 113, respectively, that transitions as a hyperbolic or parabolic function toward the throat 108. The throat of the restrictor, in all embodiments disclosed herein, does not define a Venturi gap and is not open to a suction port; it is just the junction of the end of the inlet cone 106 with the beginning of the outlet cone 110.

Figure 1C:
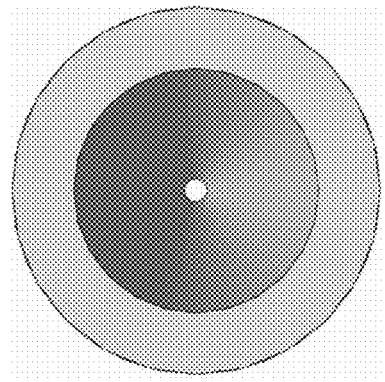
FIG. 1C is a cross-sectional plan view taken along line 1C-1C in FIG. 1A.

The inlet cone 110 and the outlet cone 112, in the embodiment in FIG. 1A, each have a circular geometry as shown in FIG. 1C, a transverse cross-section along line C-C in FIG. 1A relative to the longitudinal axis A. The geometry of the transverse cross-section of the inlet and outlet cones 110, 112 is not limited to a circular geometry. In another embodiment, the inlet cone 110 and/or the outlet cone 112 may have a non-circular geometry; for example, it may be elliptical, generally rectangular, or other polygonal shapes.

As labeled in FIG. 1, the inlet cone 110 has a length $L_1$ and the outlet cone 112 has a length $L_2$. Length $L_1$ is from the start of the inlet cone 110, where an inlet tube 120 transitions or becomes the inlet cone 110, to the throat 108, and length $L_2$ is from the throat 108 to the end of the outlet cone 112, where it transitions or becomes an outlet tube 124. The inlet tube 120 has a length $L_3$, which may include a rounded chamfer or fluted inner surface 122 directing fluid flow into the Venturi tube 101. The outlet tube 124 has a length $L_4$, which may include a chamfered or fluted inner surface (not shown) directing fluid flow from the outlet tube.

Figure 1B:
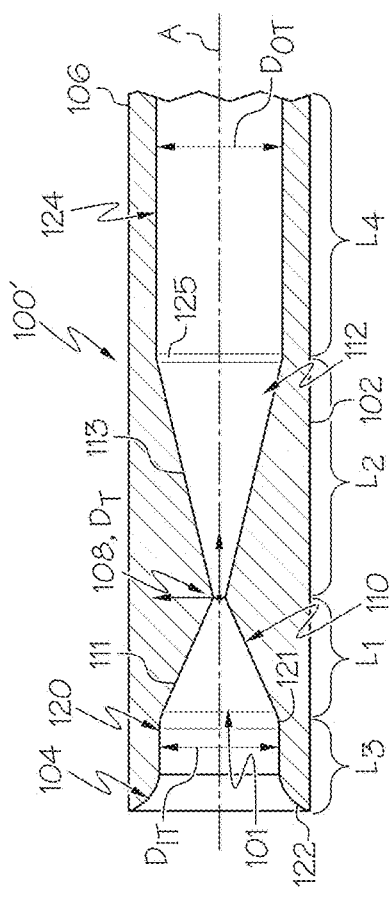

As depicted in FIGS. 1A and 1B, the length $L_2$ of the outlet cone 112 is greater than the length $L_1$ of the inlet cone 110, and both inner passageways 111, 113 thereof transition as a hyperbolic function toward the throat 108. In one embodiment, the length $L_1$ of the inlet cone 110 and the length $L_2$ of the outlet cone 112 have a ratio in the range of 1:5 to 1:8. In another embodiment, the ratio is preferably in a range of 1:6 to 1:8, and more preferably in a range of 1:7 or 1:8. The ratio defines a minimum overall length that ensures that the flow through the expansion portion of the restrictor does not separate from the wall, which provides the additional benefit of minimizing turbulence creation.

Referring now to FIG. 1B, this embodiment differs from the embodiment in FIG. 1A in that it includes a first rounded chamfer 121 at the transition between the inlet tube 120 and the inlet cone 110, which directs fluid flow into the inlet cone, and a second rounded chamfer 125 at the transition between the outlet cone 112 and the outlet tube 124, which directs fluid flow out of the outlet cone.

Figure 5:
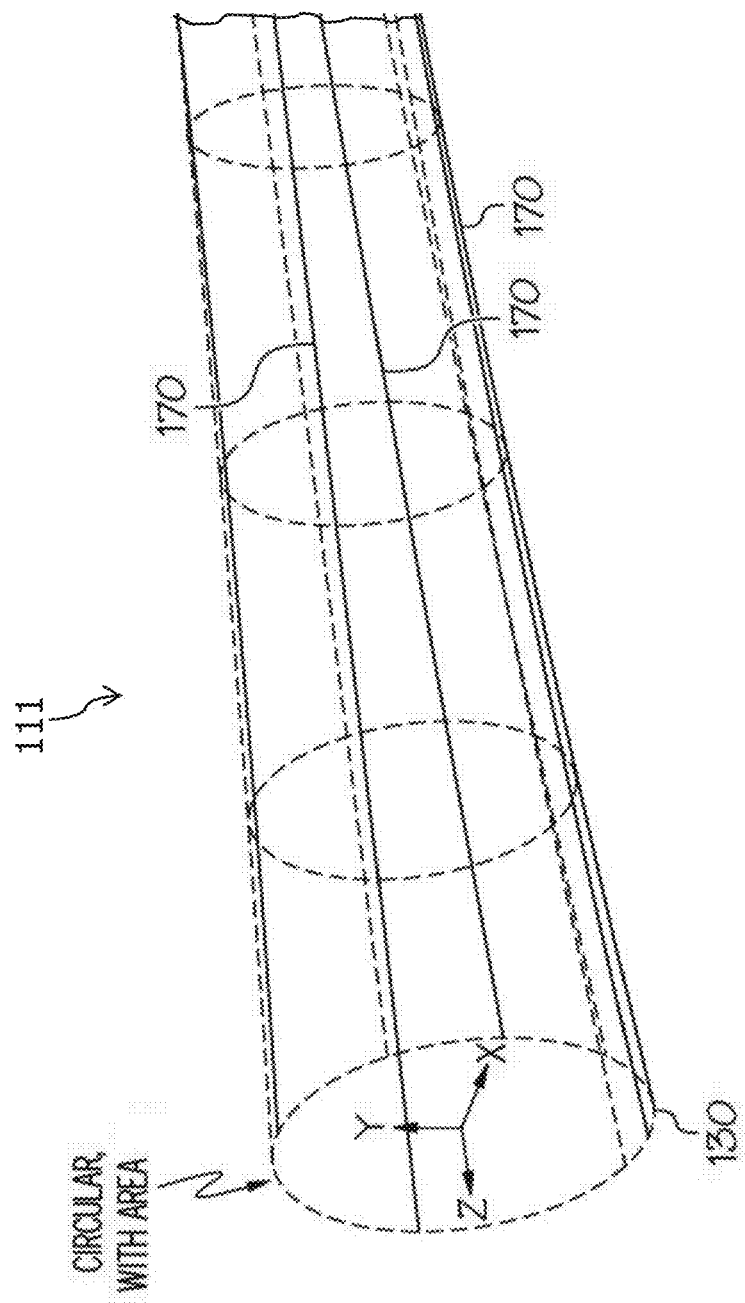
FIG. 5 is a partial section of a model of an internal passage transitioning as a hyperbolic function within an inlet cone.

Turning now to FIG. 5, an illustration of one embodiment of the shape of the internal passageway 111 within the inlet cone 110 as a hyperbolic function is shown. The internal passageway 111 begins at the entrance 130 to the inlet cone as a circular opening having an area $A_1$ and gradually, continuously transitions as a hyperbolic function to the throat 108, which has a smaller diameter relative to $A_1$. The illustration includes hyperbola lines 170 that provide the advantage of flow lines at the throat being parallel to one another. While FIG. 5 illustrates the internal passageway 111, it likewise, if rotated 180 degrees, illustrates the internal passageway within the outlet cone 112.

Figure 2A:
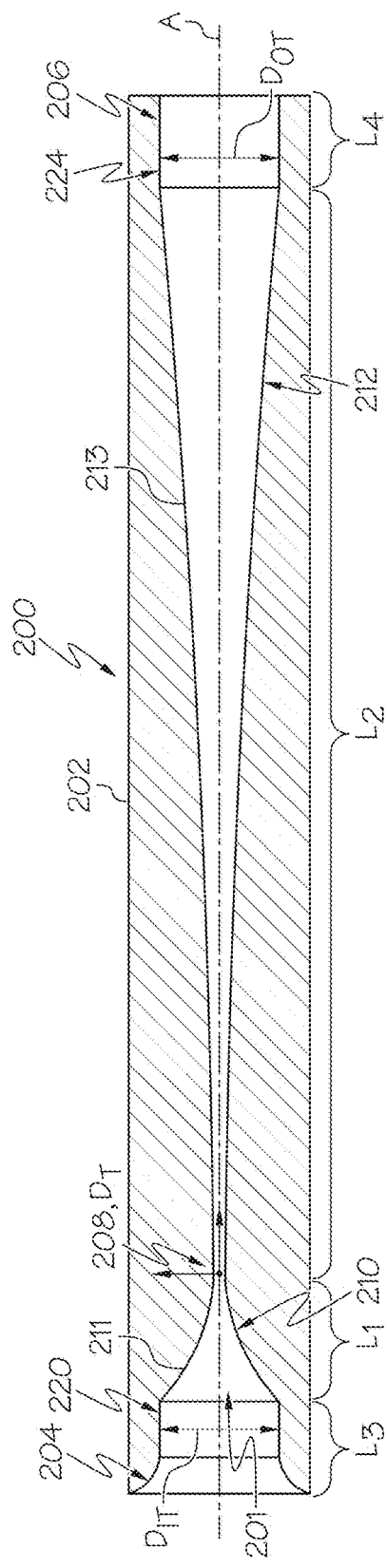
FIGS. 2A and 2B are cross-sectional, plan views of embodiments of restrictors having a Venturi tube with an inlet cone and an outlet cone converging and diverging according to a parabolic function, one without radius transitions and the other with radius transitions.
Figure 2B:
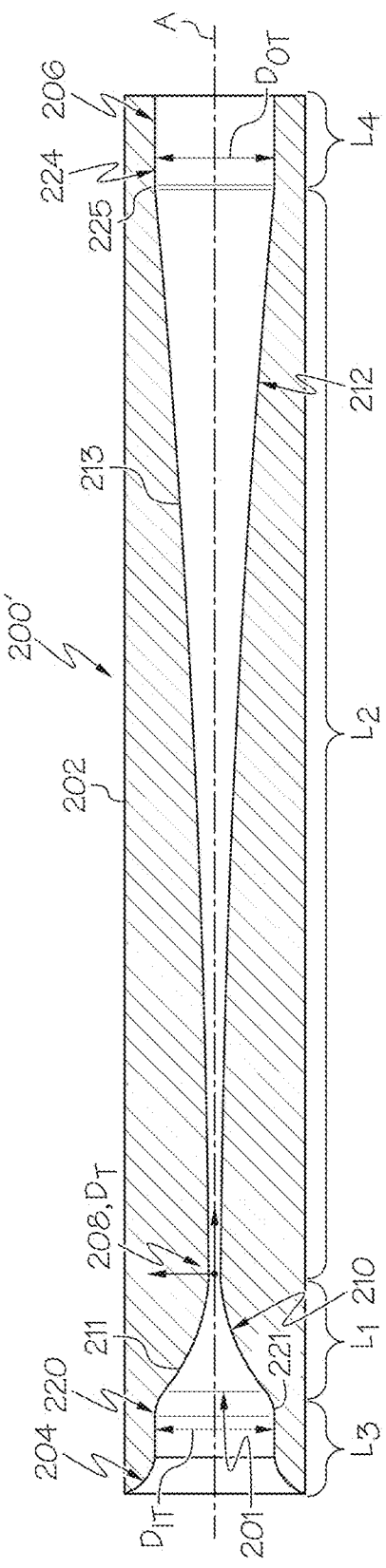

Referring now to FIGS. 2A and 2B, these embodiments differ from the embodiment in FIG. 1A in that the inner passageway 211 of the inlet cone 220 and the inner passageway 213 of the outlet cone 212 both transition as a parabolic function toward the throat 208. Otherwise, features in these figures labeled with similar reference number other than beginning with a "2" are the same or similar to the features in FIG. 1A, and descriptions thereof are not repeated. FIG. 2B further differs from the embodiment in FIG. 1A in that it includes a first rounded chamfer 221 at the transition between the inlet tube 220 and the inlet cone 210, which directs fluid flow into the inlet cone, and a second rounded chamfer 225 at the transition between the outlet cone 212 and the outlet tube 224, which directs fluid flow out of the outlet cone.

As depicted in FIGS. 2A and 2B, the length $L_2$ of the outlet cone 212 is greater than the length $L_1$ of the inlet cone 210, and both inner passageways 211, 213 thereof transition as a parabolic function toward the throat 208. In one embodiment, the length $L_1$ of the inlet cone 210 and the length $L_2$ of the outlet cone 212 have a ratio in the range of 1:3 to 1:5.

The ratio of the length $L_1$ of the inlet cone to the length $L_2$ of the outlet cone for each embodiment was determined from a comparison analysis, evaluating performance of the various restrictors against a restrictor having inner passageways of the inlet cone and the outlet cone that transition as a straight cone (the "straight restrictor") rather than as a hyperbolic function or a parabolic function. For the evaluation, certain parameters were fixed so that the only factors affecting the performance of the restrictor were the length of the outlet cone and the shape of the internal passageway of the inlet cone and the outlet cone. Those parameters include:

| Parameter | Millimeters (mm) |
| --- | --- |
| $L_1$ | 10 |
| $L_3$ | 7.5 |
| $L_4$ | $L_T - (L_1 + L_2 + L_3)$ |
| $D_{IT}$ | 10 |
| $D_{OT}$ | 10 |
| $D_T$ | 0.9206 |

$L_1$, $L_3$, and $L_4$ are defined above. $L_T$ is a selected overall length for the restrictor. In the trials herein reflected in the data displayed in the charts and graphs, $L_T$ was 115 mm and $L_2$ was variable. $D_{IT}$ is the diameter of the inlet tube, and hence is the diameter of the entrance into the inlet cone. $D_{OT}$ is the diameter of the outlet tube, and hence is the diameter of the exit from the outlet cone. $D_T$ is the diameter of the throat of the restrictor. The value for $D_T$ is selected to meet the total volume for a selected mass flow rate, which is typically dictated by the engine system that will include the restrictor. Here, 0.9206 mm was selected for the diameter of the throat based on the teachings in U.S. Pat. No. 7,431,023 to show that the restrictors disclosed herein have superior performance compared thereto. The superior performance of the restrictors disclosed herein having inner passageways in the inlet cone and the outlet cone that transition toward the throat as a hyperbolic function or as a parabolic function, with or without the first and second rounded chamfers, is shown in the graphs included as FIGS. 3 and 4.

Figure 3:
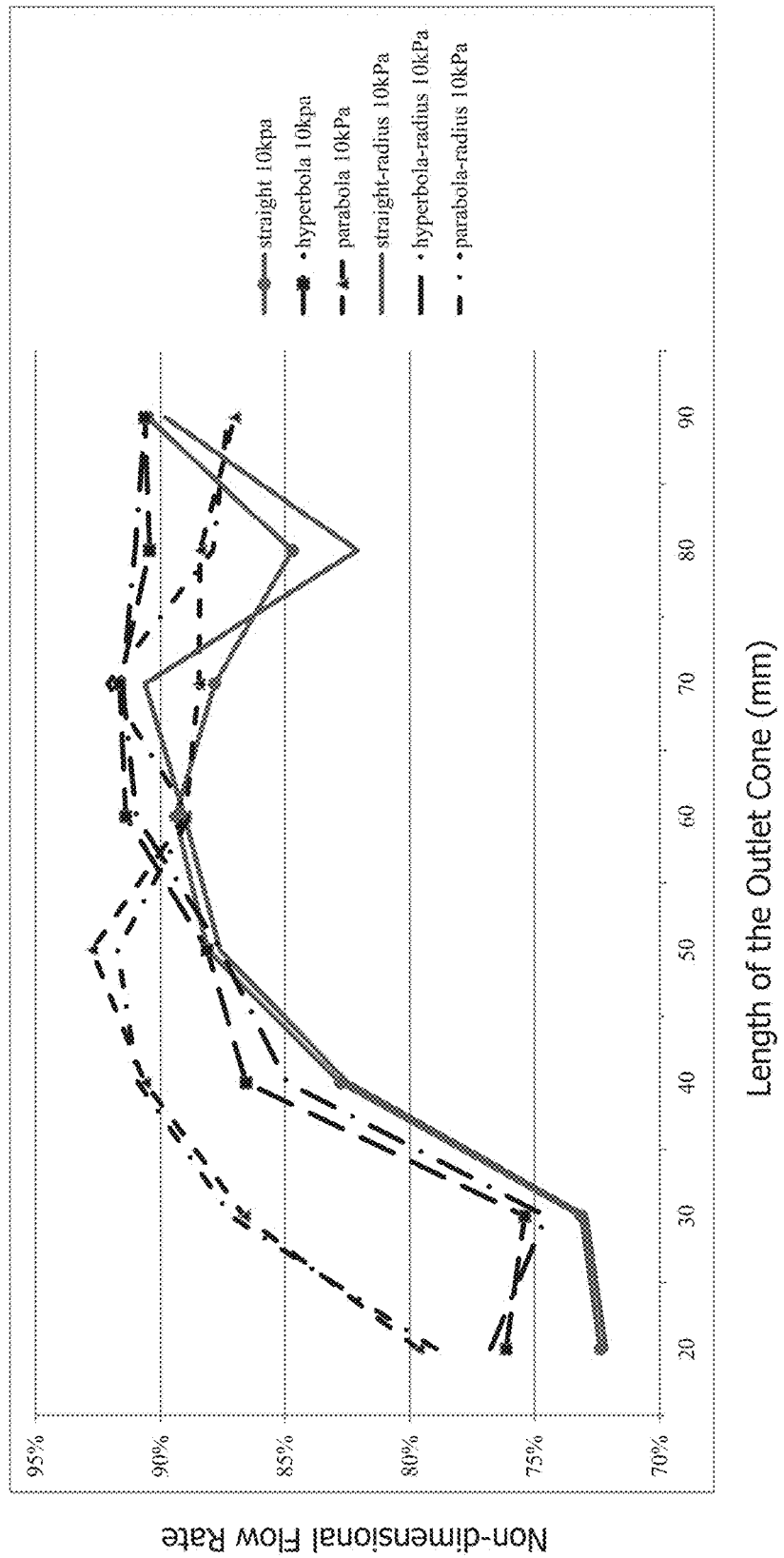
FIG. 3 is a graph of performance against increasing length of the discharge cone of various restrictors under operating conditions of a 10 kPa pressure drop.

In FIG. 3, the restrictors were evaluated under an operating condition providing a 10 kPa pressure drop across the restrictor (meaning that the pressure at the exit of the outlet cone was 10 kPa lower than the pressure at the entrance of the inlet cone) as the length of the outlet cone increased from 20 mm to 90 mm in 10 mm increments. The Y axis is a percentage evaluation of the performance of the restrictor based on dividing the computed flow in grams/second at the 10 kPa pressure drop by an average of the computed flows at 60 kPa, 55 kPa, and 50 kPa. Analysis of the results shows that the "hyperbola restrictor," the one having the inner passageways of the inlet cone and the outlet cone transition toward the throat as a hyperbolic function, performs superiorly generally over the entire range of lengths for the outlet cone relative to the "straight restrictor," and has its best performance at lengths of about 60 mm to 80 mm. Analysis of the results shows that the "parabola restrictor," the one having the inner passageways of the inlet cone and the outlet cone transition toward the throat as a parabolic function, performs superiorly generally at lengths of about 20 mm to 50 mm. Since the inlet cone length was 10 mm, the ratio of the length of the inlet cone to the outlet cone is preferably in a range of 1:5 to 1:8, more preferably in a range of 1:6 to 1:8, and even more preferably in a range of 1:7 or 1:8 for the hyperbola restrictor, and in a range of 1:2 to 1:5, and more preferably 1:3 to 1:5 for the parabola restrictor.

Figure 4:
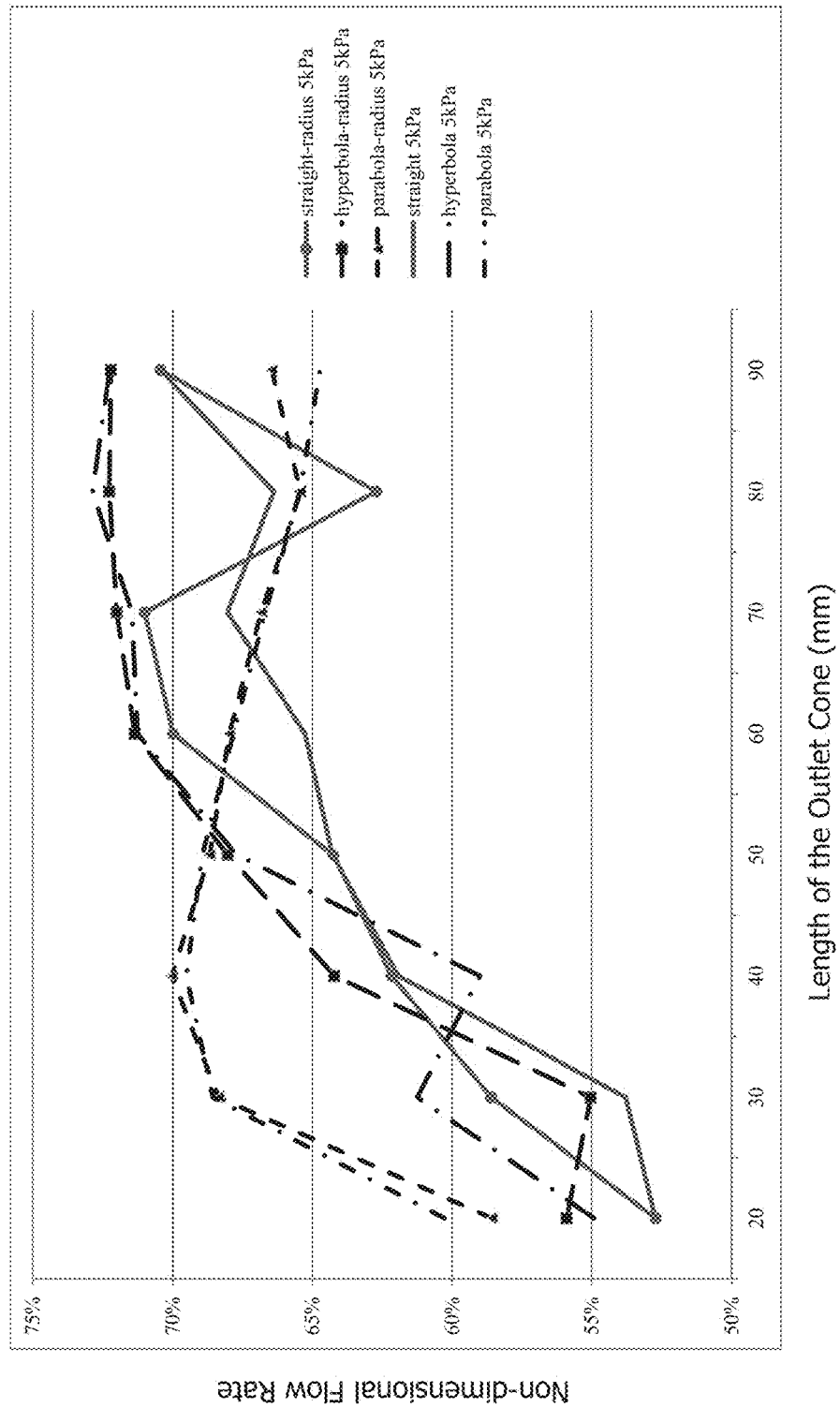
FIG. 4 is a graph of performance against increasing length of the discharge cone of various restrictors under operating conditions of a 5 kPa pressure drop.

In FIG. 4, the restrictors were evaluated under an operating condition providing a 5 kPa pressure drop across the restrictor as the length of the outlet cone increased from 20 mm to 90 mm in 10 mm increments. The Y axis is a percentage evaluation of the performance of the restrictor based on dividing the computed flow in grams/second at the 5 kPa pressure drop by an average of the computed flows at 60 kPa, 55 kPa, and 50 kPa. Analysis of the results shows that the hyperbola restrictor performs superiorly generally at lengths of 50 mm to 90 mm for the outlet cone relative to the straight restrictor, and has its best performance at lengths of about 60 mm to 80 mm. Analysis of the results shows that the parabola restrictor performs superiorly at lengths of about 20 mm to 50 mm, with its best performance at a length of 40 mm. Since the inlet cone length was 10 mm, the ratio of the length of the inlet cone to the outlet cone is preferably in a range of 1:5 to 1:8, more preferably in a range of 1:6 to 1:8, and even more preferably in a range of 1:7 or 1:8 for the hyperbola restrictor, and in a range of 1:2 to 1:5, and more preferably 1:3 to 1:5 for the parabola restrictor.

Figure 6:
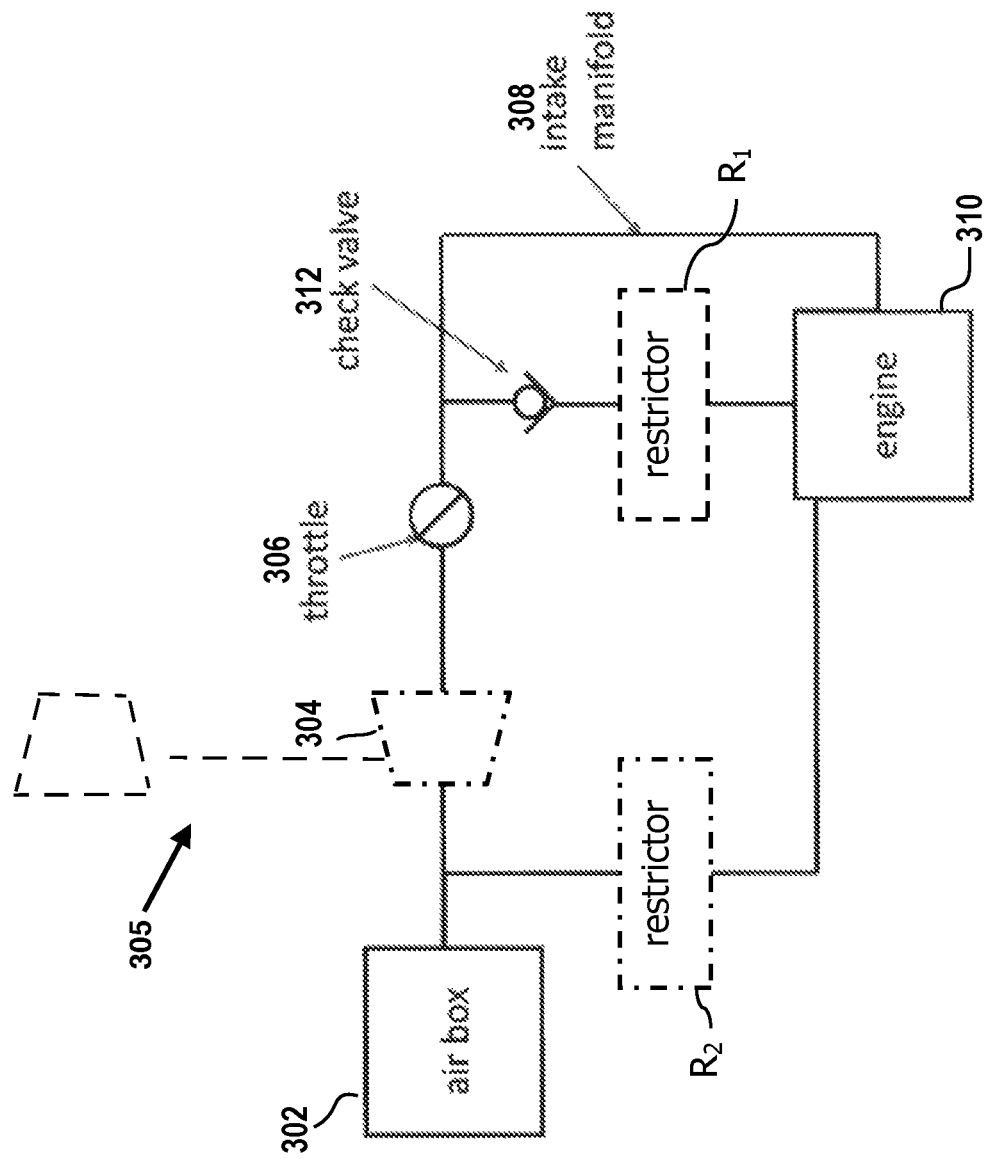
FIG. 6 is a partial diagram of an engine system that optionally includes one or more restrictors of the type disclosed herein and may be a naturally aspirated engine or a boosted engine with a compressor (typically from a turbocharger) present.

The restrictors 100, 100', 200, 200' may be used in an engine, for example, in a vehicle's engine, as a form of control on the flow of fluid from a crankcase of an engine. An example engine system 200 is schematically illustrated in FIG. 6 as an air box 302 connected to a compressor 304 (optional) of a turbocharger 305, then throttle 306, then air intake manifold 308, then engine 310, with a check valve 312 leading to a first restrictor $R_1$ connected to the engine downstream of the throttle 306, and a second restrictor $R_2$ fluidly connected to the engine 310 between the air box 302 and the compressor 304. The restrictors disclosed herein, i.e., the hyperbolic restrictor or the parabolic restrictor or a combination thereof, may be included in an engine system where a first component of the engine is in fluid communication with the inlet cone of one such restrictor, and a second component of the engine is in fluid communication with the outlet cone of such restrictor. Accordingly, during operation of the engine system, a pressure drop occurs between the first component and the second component. As seen in FIG. 6, if the first restrictor $R_1$ is referenced, the first component is the engine, in particular the crankcase thereof, and the fluid is blowby gas, and the second component is the intake manifold of the engine. The engine system in FIG. 6 may be a naturally aspirated engine, in which case the optional compressor is not present, or a boosted engine having the compressor, typically as part of a turbocharger 305. FIG. 6 further illustrates that if the second restrictor $R_2$ is present, the first component is the engine, in particular the crankcase thereof, and the fluid is blowby gas, the compressor is present, and the second component is the compressor of a turbocharger. Accordingly, if the engine is a naturally aspirated engine, typically only the first restrictor $R_1$ will be present, and if the engine is a boosted engine, the first restrictor $R_1$ and/or the second restrictor $R_2$ may be present.

The restrictors disclosed herein may be molded as a monolithic body. In one embodiment, the restrictors are formed by injection molding. The exterior of the body 102, 202 of the restrictors in FIGS. 1A to 2B may be any shape and configuration as long as the internal passageways of the inlet cone and the outlet cone are as disclosed herein.

Figure 7:
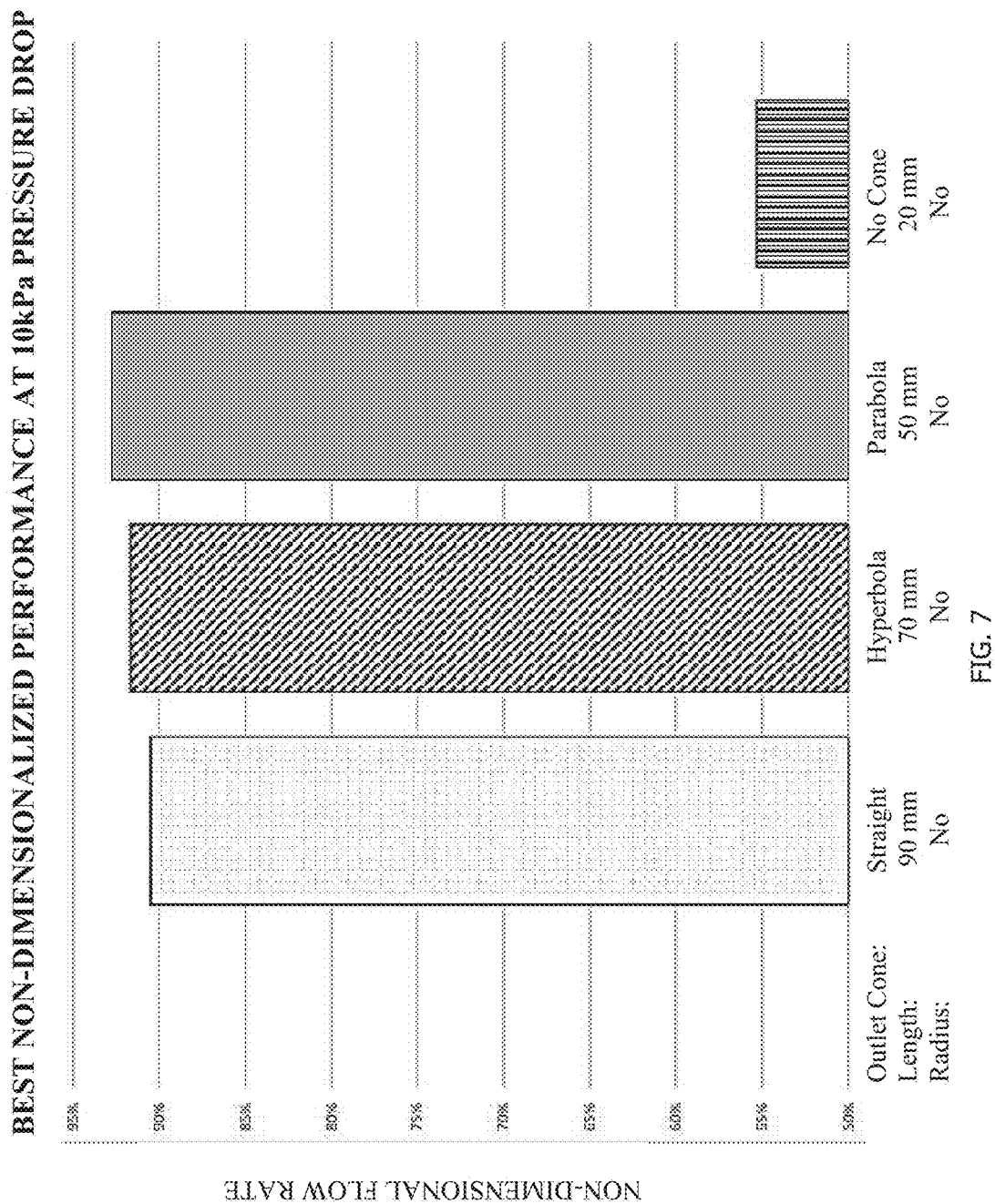
FIGS. 7-10 are graphs of the best performance results for various restrictors at different pressure drops.

FIGS. 7-10 are graphical representations of the best performances of the various restrictors, with performance expressed as a percentage representing a non-dimensional flow rate, normalized for direct comparison of the different shaped passages of the restrictors. Using the information in FIGS. 7-10, one of skill in the art can evaluate the desired performance expected of a product based on the conditions the product will experience and then select which shape and length should be used for the outlet cone, and additionally, whether to include a transition having a radius as disclosed herein. FIG. 7 graphically represents the best performance at a 10 kPa pressure drop of a straight, hyperbola, and parabola cone restrictor against one with no cone, all of which do not include any radius at the transitions. The best performance for the straight cone restrictor was with an outlet cone length of 90 mm. The best performance for the hyperbola cone restrictor was with an outlet cone length of 70 mm. The best performance for the parabola cone restrictor was with an outlet cone length of 50 mm.

Figure 8:
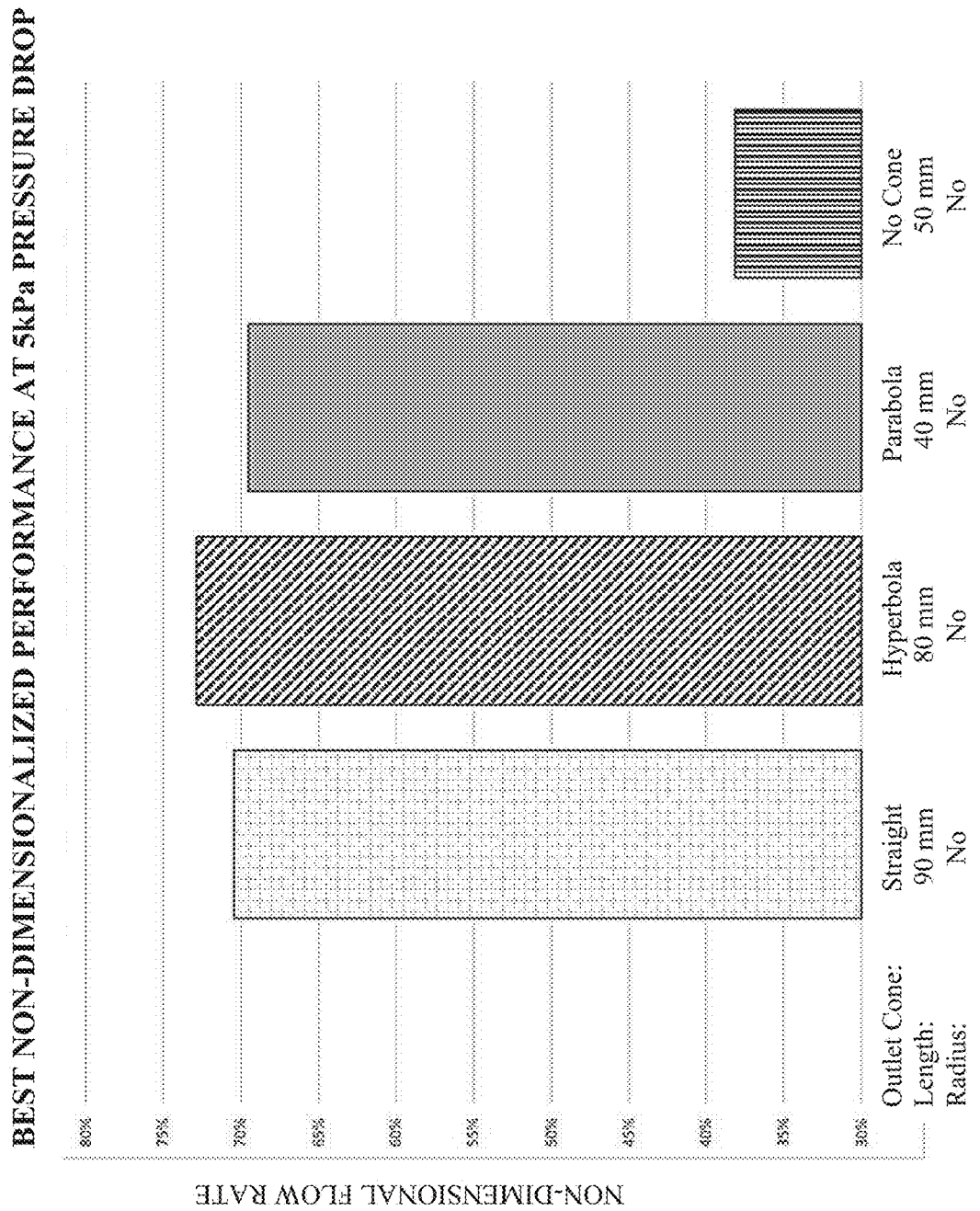

FIG. 8 graphically represents the best performance at a 5 kPa pressure drop of a straight, hyperbola, and parabola cone restrictor against one with no cone, all of which do not include any radius at the transitions. The best performance for the straight cone restrictor was with an outlet cone length of 90 mm. The best performance for the hyperbola cone restrictor was with an outlet cone length of 80 mm. The best performance for the parabola cone restrictor was with an outlet cone length of 40 mm.

Figure 9:
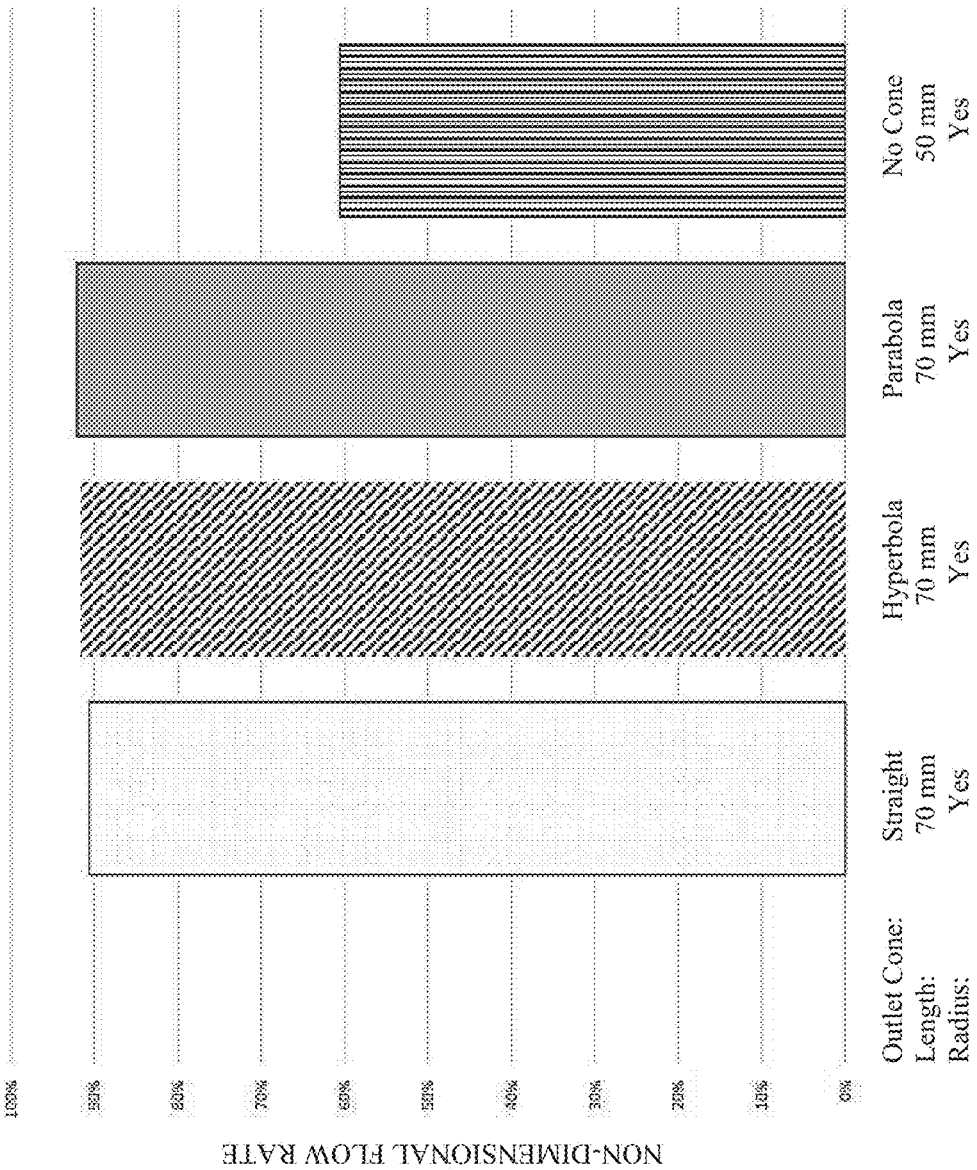

FIG. 9 graphically represents the best performance at a 10 kPa pressure drop of a straight, hyperbola, and parabola cone restrictor against one with no cone, all of which include a radius at the transitions. The best performance for the straight cone restrictor was with an outlet cone length of 70 mm. The best performance for the hyperbola cone restrictor was with an outlet cone length of 70 mm. The best performance for the parabola cone restrictor was with an outlet cone length of 70 mm.

Figure 10:
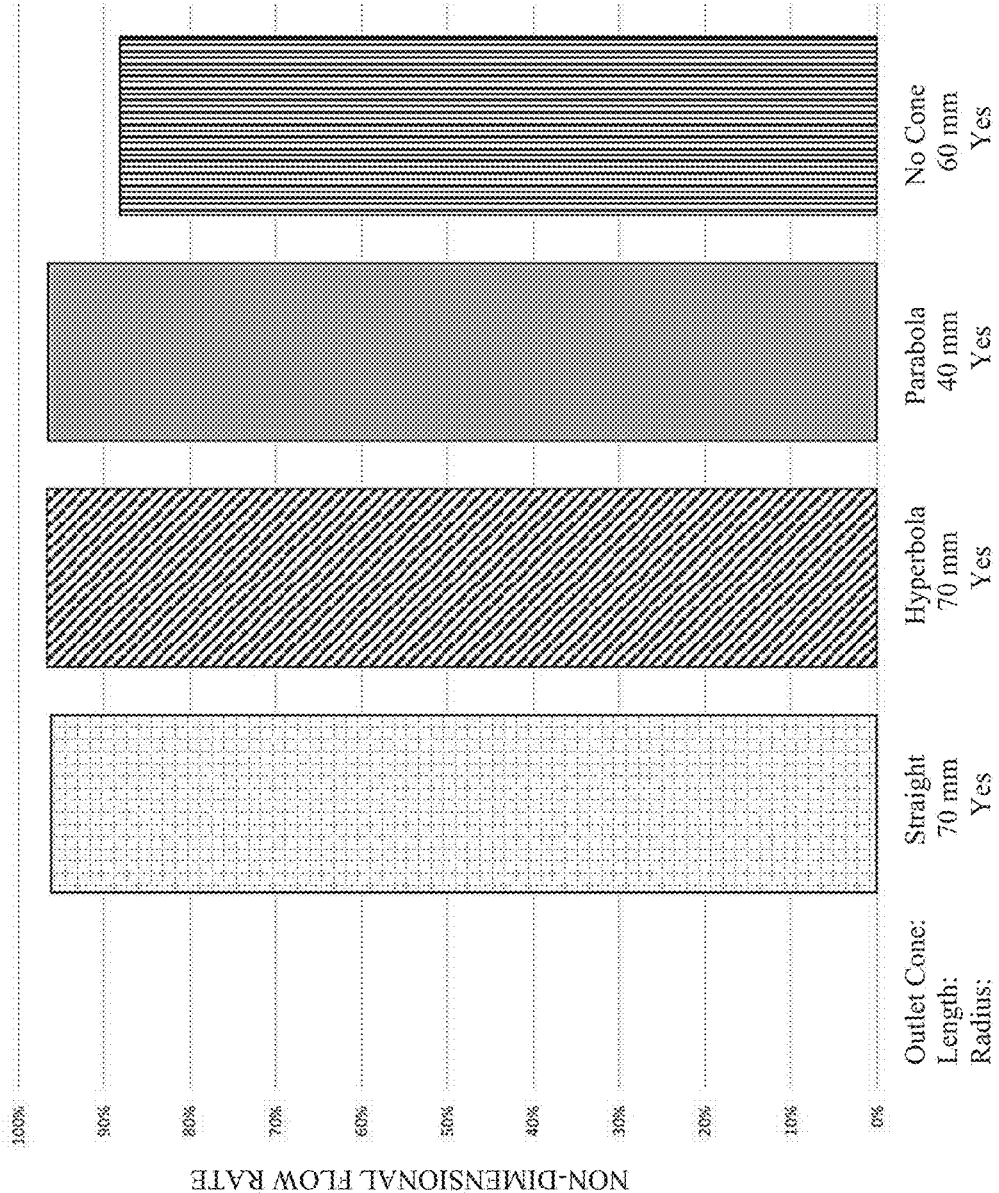
Figure 11:
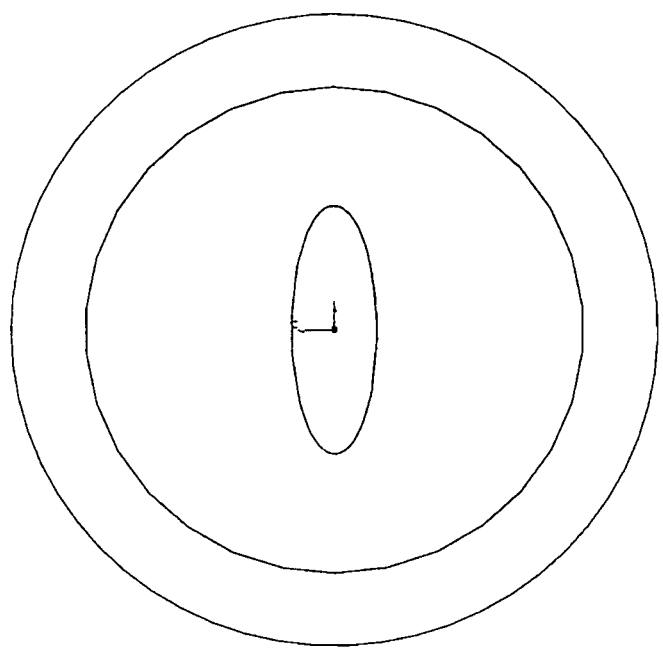
FIG. 11 is an end view from the inlet cone of an embodiment of a restrictor.
Figure 12:
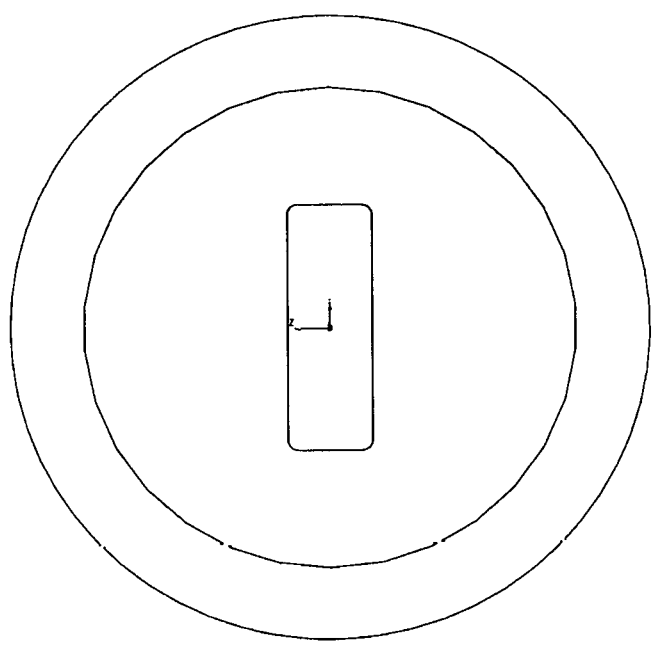
FIG. 12 is an end view from the inlet cone of another embodiment of a restrictor.

FIG. 10 graphically represents the best performance at a 5 kPa pressure drop of a straight, hyperbola, and parabola cone restrictor against one with no cone, all of which include a radius at the transitions. The best performance for the straight cone restrictor was with an outlet cone length of 70 mm. The best performance for the hyperbola cone restrictor was with an outlet cone length of 70 mm. The best performance for the parabola cone restrictor was with an outlet cone length of 40 mm.

Although the invention is shown and described with respect to certain embodiments, it is obvious that modifications will occur to those skilled in the art upon reading and understanding the specification, and the present invention includes all such modifications.

What is claimed is:

1. A restrictor comprising:
    a body defining a Venturi tube having a throat defining a junction of a converging inlet cone to a diverging outlet cone along a longitudinal axis thereof;
    wherein the converging inlet cone and the diverging outlet cone each define an inner passageway that transitions as a hyperbolic or parabolic function toward the throat;
    wherein the inner passageway of the inlet cone and the inner passageway of the outlet cone both transition as a parabolic function toward the throat, and a length of the converging inlet cone and a length of the diverging outlet cone have a ratio in the range of 1:3 to 1:5.

2. A system comprising:
    an engine that is naturally aspirated or boosted;
    restrictor comprising a body defining a Venturi tube having a throat defining a junction of a converging inlet cone to a diverging outlet cone along a longitudinal axis thereof; wherein the converging inlet cone and the diverging outlet cone each define an inner passageway that transitions as a hyperbolic or parabolic function toward the throat;
    a first component in fluid communication with the inlet cone of the restrictor; a second component in fluid communication with the outlet cone of the restrictor;
    wherein, during operation of the system, a pressure drop occurs between the first component and the second component;
    wherein the inner passageway of the inlet cone and the inner passageway of the outlet cone both transition as a parabolic function toward the throat, and a length of the converging inlet cone and a length of the diverging outlet cone have a ratio in the range of 1:3 to 1:5.

3. The system of claim 2, wherein the first component is a crankcase and the fluid in fluid communication with the inlet cone is blowby gas.

4. The system of claim 3, wherein the second component is an air intake manifold of an engine.

5. The system of claim 3, wherein the second component is a compressor of a turbocharger.

6. A system comprising:
    an engine that is naturally aspirated or boosted;
    a restrictor comprising a body defining a Venturi tube having a throat defining a junction of a converging inlet cone to a diverging outlet cone along a longitudinal axis thereof; wherein the converging inlet cone and the diverging outlet cone each define an inner passageway that transitions as a hyperbolic or parabolic function toward the throat;
    a first component in fluid communication with the inlet cone of the restrictor; a second component in fluid communication with the outlet cone of the restrictor;
    wherein, during operation of the system, a pressure drop occurs between the first component and the second component;
    wherein the inner passageway of the inlet cone and the inner passageway of the outlet cone both transition as a hyperbolic function toward the throat, and a length of the converging inlet cone and a length of the diverging outlet cone have a ratio in the range of 1:5 to 1:8.

7. The system of claim 6, wherein the first component is a crankcase and the fluid in fluid communication with the inlet cone is blowby gas.

8. The system of claim 7, wherein the second component is an air intake manifold of an engine.

9. The system of claim 7, wherein the second component is a compressor of a turbocharger.

10. The system of claim 6, wherein the ratio is in the range of 1:6 to 1:8.

11. The system of claim 6, wherein the inlet cone begins with a rounded chamfer directing fluid flow into the inlet cone.

12. The system of claim 6, wherein the outlet cone terminates with a rounded chamfer directing fluid flow out of the outlet cone.

13. A restrictor comprising:
    a body defining a Venturi tube having a throat defining a junction of a converging inlet cone to a diverging outlet cone along a longitudinal axis thereof;
    wherein the converging inlet cone has an entrance defining a circular opening and the inlet cone begins with a rounded chamfer directing fluid flow into the inlet cone;
    wherein the converging inlet cone and the diverging outlet cone each define an inner passageway that transition as a hyperbolic function toward the throat or as a parabolic function toward the throat;
    wherein each hyperbolic or parabolic function has flow lines at the throat that are parallel to one another, thereby providing a constant rate of flow through the restrictor without creating a vena contracta;
    wherein the throat is a junction of the end of the converging inlet cone with a beginning of the outlet cone, thereby having no length,
    wherein the outlet cone terminates with a rounded chamfer directing fluid flow out of the outlet cone.

14. A restrictor comprising:
    a body defining a Venturi tube having a throat defining a junction of a converging inlet cone to a diverging outlet cone along a longitudinal axis thereof;

wherein the converging inlet cone has an entrance defining a circular opening, and the converging inlet cone and the diverging outlet cone each define an inner passageway that transition as a hyperbolic function toward the throat or as a parabolic function toward the throat;

wherein each hyperbolic or parabolic function has flow lines at the throat that are parallel to one another, thereby providing a constant rate of flow through the restrictor without creating a vena contracta;

wherein the throat is a junction of the end of the converging inlet cone with a beginning of the outlet cone, thereby having no length; and wherein the throat has a diameter that is less than 1 mm and a length of the outlet cone is in the range of 20 mm to 90 mm.

15. The restrictor of claim 14, wherein the inner passageway of the inlet cone and the inner passageway of the outlet cone both transition as a hyperbolic function toward the throat, and a length of the converging inlet cone and a length of the diverging outlet cone have a ratio in the range of 1:5 to 1:8.

16. The restrictor of claim 15, wherein the ratio is in the range of 1:6 to 1:8.

17. The restrictor of claim 14, wherein the inner passageway of the inlet cone and the inner passageway of the outlet cone both transition as a parabolic function toward the throat, and a length of the converging inlet cone and a length of the diverging outlet cone have a ratio in the range of 1:3 to 1:5.

18. The restrictor of claim 14, wherein the inlet cone begins with a rounded chamfer directing fluid flow into the inlet cone.

19. The restrictor of claim 18, wherein the outlet cone terminates with a rounded chamfer directing fluid flow out of the outlet cone.

20. The restrictor of claim 14, wherein the inlet cone has a non-circular geometry when viewed as a cross-section transverse to the longitudinal axis.

21. The restrictor of claim 20, wherein the non-circular geometry is rectangular.

22. The restrictor of claim 20, wherein the outlet cone has a non-circular geometry when viewed as a cross-section transverse to the longitudinal axis.

\* \* \* \* \*